Patented May 22, 1934

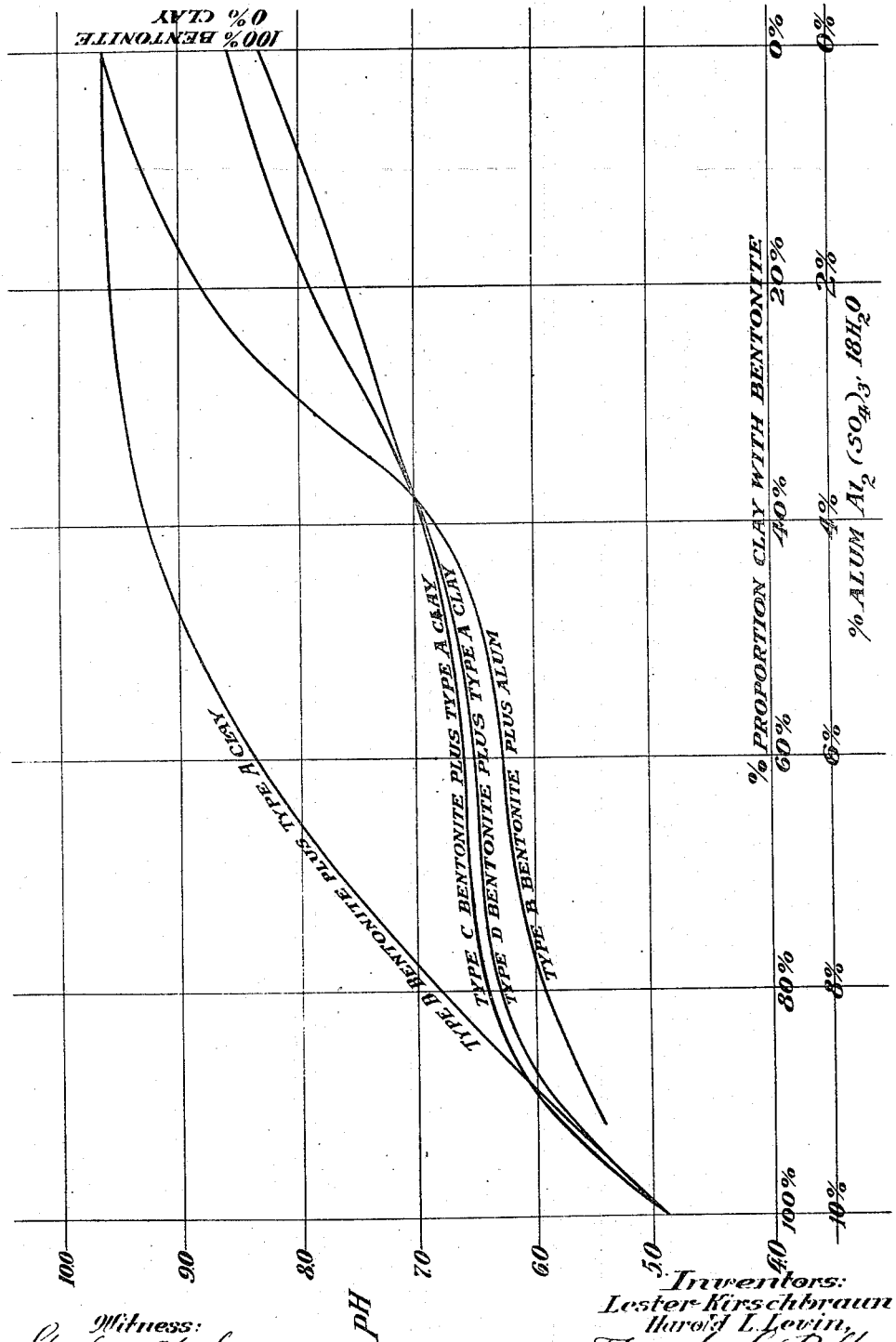

1,960,112

UNITED STATES PATENT OFFICE 1,960,112

PROCESS OF PRODUCING EMULSIONS OR DISPERSIONS

Lester Kirschbraun, Leonia, and Harold L. Levin, Nutley, N. J., assignors, by mesne assignments, to The Patent and Licensing Corporation, New York, N. Y., a corporation of Massachusetts Original application December 17, 1925, Serial No. 76,012. Divided and this application October 20, 1928, Serial No. 313,842

3 Claims. (Cl. 134—1)

This invention relates to improvements in process of producing emulsions or dispersions of pitch and/or oleaginous bodies with mineral powders which are insoluble in water but suspendable therein to form a paste or slurry. Such powders comprise clays, bentonites, argillaceous minerals, finely divided silicates, metallic oxides and hydroxides, pigments and in general, finely divided mineral matter having more or less plasticity and/or viscosity when suspended or mixed with water to a paste or slurry form.

The pitchy or oleaginous material dealt with in this connection, includes a wide variety of substances, including bitumens, liquid and solid hydrocarbons, resins, natural and artificial, ester gums, stearines, waxes, tempered if desired, with fluxing oils, which may be petroleum products, drying or non-drying oils, or fatty acids. The more solid of these may be generally said to partake of a pitchy nature and possess in common the property of being immiscible with water, and rendered fusible or more limpid with heat. They will constitute in this process, the material undergoing dispersion or the dispersed phase of the product.

Experience in producing emulsions of the kind referred to has developed the fact that certain types of pitches and oleaginous bodies emulsify more readily with particular types of mineral substances of the above character. While usually some quantity of most pitches can be dispersed with many kinds of mineral base, yet the amount of pitch dispersed in many instances is so small as to constitute a minor or insufficient portion of the resulting product. The resulting dispersion in such cases is so highly loaded with mineral matter that the pitchy substance is unable to function as a binder and no utility of commercial importance resides in a product of such character.

In the course of experience in handling and emulsifying pitchy substances and combinations such as referred to, it has been found that a given pitch would emulsify better with, for instance, one type of clay, than another; that in certain instances, combinations of clays afford superior emulsive properties; that combinations of bentonites with clays or bentonites with other mineral powders may afford the optimum emulsive properties for a given pitchy base. Or, given a certain colloidal paste-forming emulsifying agent, a change in the character of the pitch often makes it possible to produce rapidly an emulsion or dispersion, whereas the original or unmodified material would disperse with difficulty in small quantities or coarsely, if at all.

As a result of extended study and observations, it has been discovered that one of the most important elements in understanding and controlling the above described behavior, resides in the hydrogen ion concentration of the aqueous suspension or paste of the emulsifying agent. It has been further discovered, that the hydrogen ion concentrations of such suspensions are not only important of themselves, but must be considered in relation to the acidic or basic character of the pitch which is to be emulsified, as well as to the other physical properties of the dispersing agent, such as surface tension, plasticity, degree of fineness, and possibly other factors not yet known.

It will be understood from the nature of the substances referred to above as pitchy, or employed for dispersion, that some of them may be basic and some of them may be of an acidic nature. For example, both rosin and stearine pitch are naturally acidic. A fluxing oil such as oleic acid is acidic. Certain grades of paracumaron are basic. Asphaltic residues vary from acidic to basic, the lighter or thinner residues such as fuel oil or residuum from Mexican stock being acidic, the acidity diminishing as the material becomes heavier, passing through a neutral range at certain stages and actually becoming basic with the harder varieties of asphalts.

That this latter is true, may be deduced from the fact that using a given clay of say pH 6.0 as dispersing agent, and dispersing thereby a certain amount of say, 120 degrees F. melting point steam refined Mexican asphalt, the pH value of the resultant dispersion progressively increases with increments of asphalt dispersed, until a point is reached at which either no further asphalt can be dispersed and the emulsion breaks, or the addition of acidic bodies in regulated quantities becomes necessary to enable further dispersion of the asphalt base to take place.

These phenomena become understandable and controllable in the light of the hydrogen ion concentration or pH value of the dispersing agent, and the adjustment of same in relation to the type of pitch undergoing emulsification or dispersion.

It has been found that clays, bentonites and mineral substances of the class referred to, vary greatly as to their pH value when suspended in water, from a noticeable high degree of acidity to a substantial alkalinity. Further, combinations of clays or mineral substances when brought together, result in modified (though not algebraically additive) pH characteristics. Adjustments of pH value for various dispersing materials can be made by a study of the pH value of the individual mineral powders as well as a study of their pH characteristics when brought together in varying proportions. In this way it is possible to prepare a combination of emulsifying minerals of a predetermined pH value by either combining them, or by treating them either alone or in combination, with suitable amounts of either basic or acidic substances.

It will, of course, be apparent, that the type of water used as the suspending medium will be of great importance, and must be considered in predetermining the pH value of the final system. Likewise, the character of pitch undergoing dispersion and its effect in modifying the pH value of the system must be taken into account.

In order that the general principle of operation may be thoroughly understood, there is presented a drawing showing as an example, a graphical plot of the pH value of a combination of a number of bentonites with a New Jersey ball clay in varying proportions, pH value being plotted as ordinates and the percentage concentration of each of the constituent mineral dispersing agents as abscissæ. There is likewise exhibited a plot showing the pH characteristics of one of the bentonites known as Type B with modification by aluminum sulphate

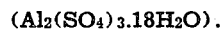

$(Al_2(SO_4)_3 \cdot 18H_2O)$.

It will be apparent that a wide range of pH value may be achieved by proper admixture of two types of dispersing media, and that with a given dispersion medium such as say, Type B, which of itself has a pH value of approximately 9.5, practically any suitable modification of this value may be attained by treatment of this particular type of dispersing media with alum or other acidic reagent.

It has been found by practical determination, that an asphaltic material such as 120 degrees F. melting point steam refined Mexican asphalt, will emulsify quite satisfactorily with a mixture of about one-half Type C or D with one-half Type A clay. If Type B is used in place of the Type C, the emulsive properties of the mixture become decidedly diminished so that relatively little asphalt may be dispersed. If it be attempted to employ the Type B or the Type C alone, the same result follows. The optimum pH value for dispersion of this particular kind of pitch is apparently around 6.0-6.5, and by modifying the pH of the Type B in any suitable way to achieve this pH satisfactory dispersion will then result where no efficient dispersion could be obtained. This same procedure followed for any other type of material will disclose the optimum pH value at which it will efficiently disperse large quantities of that material.

While dispersion takes place with this particular pitch under the condition cited, that is, where the aqueous suspension of the dispersion means has a pH of 6.5 (with the particular water used) nevertheless, a limit of the amount of asphalt to be dispersed is reached when approximately fifteen times as much asphalt has been dispersed in relation to the clay. If then the pH value of the system be determined, it will be found that the pH value has increased substantially. If the system be treated with an acidic salt or with an acid in regulated quantities so as to reduce the pH of the system, further quantities of asphalt can then be dispersed.

Under commercial conditions the dispersion is carried out in a continuous emulsifier, so that the pH of the final system may be anticipated by adjusting the pH of the aqueous suspension of the emulsifying agent in relation to the effect upon the pH of the pitch undergoing dispersion. This may be done by either treating the dispersion means as described, or introducing the desired amount of reagent into the emulsifying mill, or by introducing a buffer salt which will hold the pH value or hydrogen ion concentration to within substantially predetermined constant limits.

In the previous example given, Mexican asphalt of about 120 degrees F. melting point dispersed under the conditions referred to satisfactorily at a pH of between 6.0 to 6.5. As a matter of practical experience in operating a continuous process even inside this range, a preferable condition is found at pH 6.3. If a somewhat harder asphalt is used of the same general origin, the best pH conditions are found at from 6.1 to 6.2. On the other hand where a pitch of entirely different character is employed, such for instance as stearine pitch prepared from vegetable oils, an optimum emulsive condition exists at around pH 8.0. It is to be understood of course, that we do not in any way wish to limit ourselves to these examples or figures as they are merely illustrative.

It will thus be seen that by adjusting the pH value of the aqueous dispersion means or components of the system, the peculiarities of behavior of various emulsifying powders and pitches may be controlled so that practically any emulsifying mineral in finely divided form can be treated to emulsify practically any pitch.

Having determined for a given pitch, satisfactory emulsive conditions, thereafter other dispersion means should be adjusted to the same pH conditions thus determined. Where it is desired for any reason to use an emulsifying material without treatment, it is possible, knowing the pH characteristics, to modify the pitchy base to enable effective dispersion to take place. Emulsifying materials in the basic range are capable of effectively dispersing pitches which are acidic in character, and vice versa. Thus, in order to be effectively dispersed with a basic bentonite without treatment, a pitch such as cumar may be treated with rosin or with oleic acid to bring it within an acidic range. Likewise, should it be desirable to utilize an acidic clay without treatment, dispersion of a given pitch which is of an acidic character can be facilitated by the addition thereto of a fluxing agent such as soft paracumaron, or oil soluble organic bases; or there may be incorporated into the pitch, a basic mineral powder such as metallic oxide or hydroxide, preferably those of the alkaline earth series, or asbestine, which when incorporated uniformly throughout the pitch, makes it possible to disperse more effectively with an acidic clay. In other words, it seems necessary to maintain a pH differential between the phases.

A further feature of this invention resides in the subsequent treatment of the emulsion after it has been made, to modify its pH value and thereby modify the properties of the final system. If for example, a bentonite in the alkaline range, of say, pH 9, be employed for dispersion of an asphaltic product as heretofore referred to, the bentonite may be treated with say, sulphuric acid, to bring it to about pH 6.0, when dispersion will take place effectively. Thereafter by the addition of suitable bases such as barium hydroxide, the sulphuric acid may be eliminated from solution and the pH of the system restored. This is of importance in connection with the protection of these emulsions from injury by freezing, inasmuch as a certain degree of deflocculation is required and the emulsion is advantageously brought within certain limits upon the alkaline side, approximating for such a system as described, 7.6 pH. At this value if the material does freeze, the emulsion will not break and may be successfully restored upon thawing without the occurrence of particle agglomeration. This value may not be the same for all systems. The ability of the emulsion to remain more perfectly in suspension is likewise dependent to a considerable extent upon the pH of the final system, so that the step of adjustment to suit more perfectly the final characteristics desired of the emulsion product, is exceedingly important.

Where an emulsion is made in the alkaline range it is sometimes desirable to treat the final product with acid in order to bring the pH of the system noticeably on the acid side, under which condition with such asphalts as described above, the end product is more resistant to water action.

The addition of sulphuric acid in proportion sufficient to bring pH of the system down to 4.5 or less, effectively accomplishes the above result. This may not be entirely a matter of the actual pH of the system, but is probably further affected by the reaction of sulphuric acid upon the mineral powder, which operates as the water evaporates to concentrate the acid and react chemically with the mineral powder, or to change otherwise its colloidal or emulsive properties so that when the water is removed, the dry film of pitchy material no longer contains materials capable of acting as an emulsifying agent and thereby reduce any tendency toward re-emulsification.

By the term "pitchy" as used in the claims, it is understood that we include the wide variety of substances set forth in one of the introductory paragraphs of this specification.

We claim as our invention:

1. A product consisting of an unflocculated dispersion of a pitchy base in an aqueous vehicle containing a paste forming mineral powder colloid dispersing agent, the hydrion concentration of said dispersion being not less than 6.0 but below the hydrion concentration which would normally result from dispersion of said pitchy base with said emulsifying agent.

2. A product consisting of an unflocculated dispersion of a pitchy base in an aqueous vehicle containing a paste forming mineral powder dispersing agent, said dispersion containing a type ion foreign to either the pitchy base or emulsifying agent, the hydrogen ion concentration of said dispersion being not less than 6.0 but less than the hydrogen ion concentration which would usually result from dispersion of said pitchy base with said dispersing agent, or less than the pH of the emulsifying agent.

3. A product consisting of an unflocculated dispersion of a pitchy base in an aqueous vehicle containing a paste forming dispersing agent having a pH normally less than 9.0, said dispersion containing ions not normally yielded by either the pitchy base or emulsifying agent, the pH concentration of said system being more than 6.0 and less than 9.0.

LESTER KIRSCHBRAUN.
HAROLD L. LEVIN.